United States Patent Office 2,724,996
Patented Nov. 29, 1955

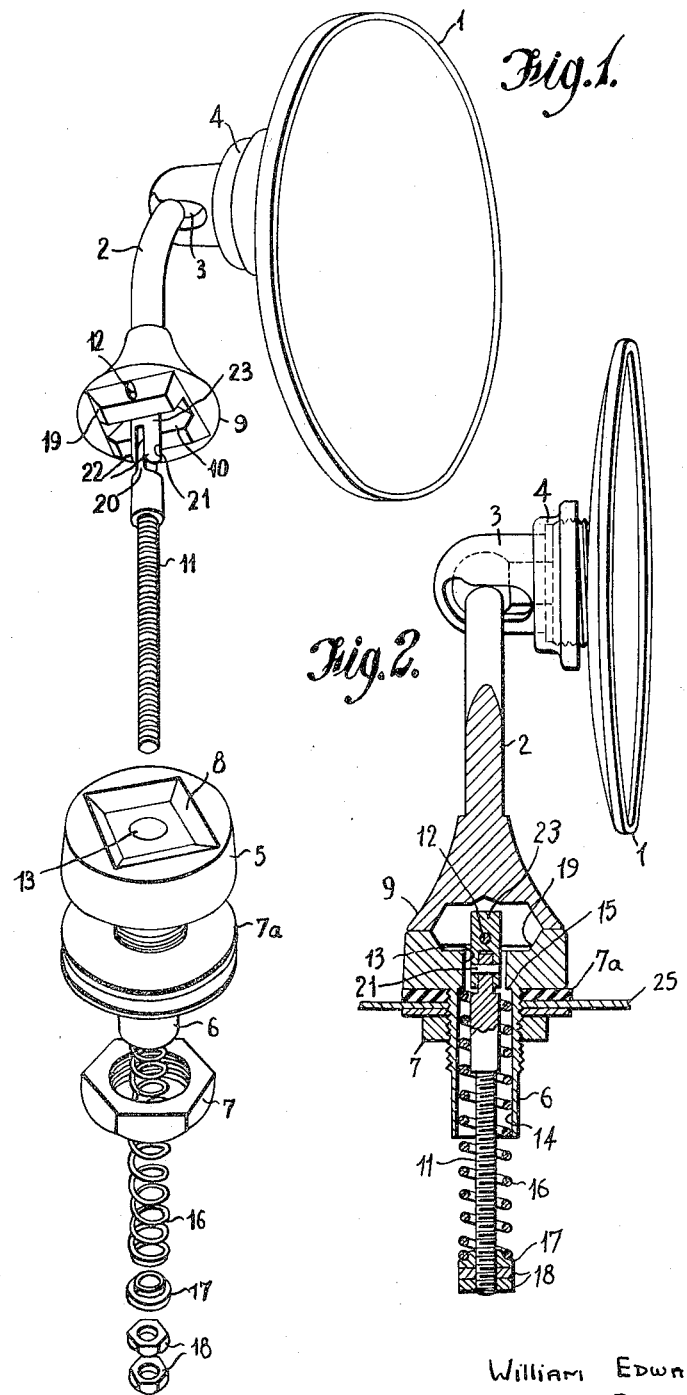

2,724,996

REAR VIEWING MIRRORS

William Edward O'Shei, London, England

Application July 28, 1952, Serial No. 301,223

Claims priority, application Great Britain
December 6, 1951

8 Claims. (Cl. 88—98)

The present invention relates to rear viewing mirrors, and especially to rear viewing mirrors of the kind adapted to be fitted outside a vehicle body, for example to wing and door mirrors. Such mirrors often get moved out of adjustment upon being hit or pushed, and if the adjusting means are so firmly tightened that movements of the mirror cannot take place, there is a risk that the mirror or its support will be broken.

The present invention consists in a rear viewing mirror in which the mirror is carried from a base member, which is adapted to be firmly secured to a vehicle body, by means of a flexible joint in such manner that the mirror may, when pushed or hit, rock and/or twist about this joint with respect to the base member against the action of resilient means, the parts of the flexible joint having interengaging means for locating them in a predetermined relative position.

The invention also consists in a rear viewing mirror in which the mirror is connected to a base member, adapted to be firmly secured to a vehicle body, by means of a flexible joint comprising two parts which are urged together into a positively located abutting relationship by means of a spring or other resilient means which allows the two parts to rock and/or twist relative to one another against the action of the spring or the like when the mirror is pushed or hit, the two parts being restored to their located relationship, when the mirror is released, by the action of the spring or the like, with if necessary manual assistance.

From another aspect, the invention consists in a rear viewing mirror comprising a mirror support, for example a stanchion, which is formed with a portion abutting against a base member adapted to be firmly secured to a vehicle body, the said portion being urged into a positively located position in abutting relationship with the base member by means of a spring or other resilient means which allows said portion, and consequently the mirror carried thereby, to rock and/or twist relative to the base member against the action of the spring or the like when the mirror is pushed or hit, the mirror being restored to its pre-set position relative to the base member when the said portion is returned by the spring or the like, with if necessary manual assistance, to its positively located position in abutting relationship with the base member.

In one embodiment of the invention, the base member may be formed with a V-shaped slot or similar channel or with a tapering cavity of pyramidal or other non-circular cross-section, in which a complementary member fitted to the end of the mirror stanchion is adapted to be located. The complementary member on the stanchion is urged by a spring or like means into a channel or cavity in the base member whereby, if the mirror should be accidently hit or pushed, the spring will allow the mirror and stanchion to rock and/or twist relative to the base member whilst the predetermined located position of the mirror will be restored as soon as the mirror is released and the complementary member is urged by the spring, with if necessary manual assistance, to the predetermined location with respect to the channel or cavity in the base member.

A separate adjustable connection is preferably provided between the mirror and the stanchion for enabling the position of the mirror to be adjusted with respect to the located position of the stanchion determined by the flexible joint, this adjustable connection being capable of being tightened or locked to secure the mirror in the adjusted position. Thus when the mirror is pushed or hit, the flexible joint allows the mirror to rock and/or twist without altering the setting of the adjustable connection.

From another aspect, therefore, the invention consists in a rear viewing mirror in which the mirror is carried from a base member, which is adapted to be firmly secured to a vehicle body, by means of an adjustable connection which can be tightened or locked to secure the mirror in a desired adjusted position, and in which a flexible joint is also provided between the mirror and the base member, the parts of this flexible joint being normally urged together by resilient means to interengage with positive location, the flexible joint permitting the mirror to rock and/or twist about this connection, without changing the adjustment of the tightened or locked adjustable connection, when the mirror is pushed or hit.

In order that the invention may be more clearly understood, an embodiment thereof will now be described with reference to the accompanying drawing in which:

Figure 1 is an exploded perspective view of a rear viewing wing mirror according to the invention and Figure 2 is a side elevation of the mirror in assembled condition, the flexible joint being shown in axial section.

The mirror proper 1 is carried by a mirror support or stanchion 2 through the medium of an adjustable ball joint 3 which can be tightened or locked in known manner by a nut 4 to secure the joint in a desired adjusted position. The stanchion 2 is carried by a flexible joint, which will be hereinafter described, from a base member 5 which is adapted to be firmly secured to the vehicle wing, for which purpose the base member is provided with a tubular stem 6 which is adapted to extend through an aperture in the wing 25 and be secured in position by a nut 7 and a rubber washer 7a.

The base member 5 is formed with a locating cavity 8, which in the illustrated example has the shape of a square-base pyramid, and is adapted to receive a complementary part 9 which is secured to the bottom end of the stanchion 2 and is formed with a pyramidal end 19 shaped to correspond to the shape of the cavity 8. Across the apex of the pyramidal end 19 is formed a groove 10 in which is pivotally secured one end of a universal joint member 23 by means of a transverse pivot pin 12. The other end of the member 23 is formed with a slot 22 extending in the same direction as the pivot pin 12, and within this slot is pivotally connected, by means of the pivot pin 21, a lug 20 secured at the end of a screwed rod 11. The screwed rod 11, which is thus connected by a universal joint to the complementary member 9, extends through a central bore 13 in the base member 5 and the co-axial bore 14 in the stem 6, there being appreciable clearance between the bore 13 and the parts of the universal joint extending thereinto. The bore 14 is of larger diameter than the bore 13, thereby forming a shoulder 15 against which rests one end of a compression spring 16, the other end of which bears against a washer 17 surrounding the end of the rod 11 and secured in position by a pair of mutually locked nuts 18. The stanchion is thus connected to the base member by means of a flexible joint, the pressure exerted by the spring 16 urging the faces of the pyramidal end 19 of the complementary member 9 into abutting relationship with the corresponding faces of the cavity 8. The stanchion is thus firmly supported from the base member in a located position, but, by reason of the flexible joint and spring 16, in the event of the mirror being accidentally hit or pushed, the spring will allow the stanchion to rock about the universal joint relative to the base member 5 and/or to twist axially about the axis of the rod 11. With either of these rocking or twisting movements, the spring 16 is further compressed so that, when the force displacing the mirror is released, the spring will tend to restore the complementary member and the stanchion and mirror carried thereby to the predetermined location relative to the base member. If the complementary member is twisted through more than 45° with respect to the base member, it will be appreciated that the complementary member will be urged by the spring to index in a different position in the cavity 8 with the mirror a quarter of a turn out of its normal position. In this event, in order to restore the mirror to its predetermined location, it is only necessary to apply manual pressure to twist the mirror back through the quarter turn to its normal location.

Whilst a particular embodiment has been described, it will be understood that various modifications may be made without departing from the scope of the invention. Thus, for example, the particular universal joint described may be replaced by a short length of flexible cable, or the flexible cable may extend completely through the bores 13, 14 and the spring 16 and be provided with a stop at its end for holding the spring 16 in a compressed condition.

In another modification, the lower end of the universal joint may be connected to a tension spring, the other end of which may be secured to the end of the stem 6 (which may, if desired, be made longer than the stem 6 shown in the drawing), to hold the spring under tension with the complementary part 9 being resiliently held in abutting relationship with the surfaces of the cavity 8.

If desired, the ends of the spring may be fixed respectively to the complementary part and the base member so that, when the mirror is twisted out of its normal position, the spring will be put into torsion and which will assist in tending to restore the complementary part to its normal position in the cavity 8.

I claim:

1. A rear viewing mirror comprising a mirror, a base member adapted to be firmly secured to a vehicle body, and a flexible joint supporting said mirror from said base member, said flexible joint comprising two parts having abutting surfaces and inter-engaging means for normally locating these surfaces in a predetermined angularly fixed abutting relationship, a coupling member connected to one of said parts and extending into a bore in the other of said parts, resilient means connecting said coupling member to said other part in a manner to allow said one part to be moved in a direction away from said other part against the action of said resilient means to release the interengaging means and allow the said one part to twist relative to said other part, said coupling member being flexible at least in part so as to permit the said one part also to be rocked to an inclined position relative to the said other part against the action of said resilient means, and said resilient means operating to restore said two parts to their predetermined angular fixed abutting relationship after disengagement thereof through accidental displacement of said mirror support.

2. A rear viewing mirror comprising a mirror, a base member adapted to be firmly secured to a vehicle body, a support member for supporting the mirror from said base member, an adjustable connection between said support member and said mirror, means for tightening or locking said adjustable connection to secure the mirror in a desired adjusted position relative to said support member, and a flexible joint supporting said support member from said base member, said flexible joint comprising two parts having abutting surfaces and inter-engaging means for normally locating these surfaces in a predetermined angularly fixed abutting relationship, a coupling member connected to one of said parts and extending into a bore in the other of said parts, resilient means connecting said coupling member to said other part in a manner to allow said one part to be moved in a direction away from said other part against the action of said resilient means to release the interengaging means and allow the said one part to twist relative to said other part, said coupling member including a universal joint arranged so as to permit the said one part to be rocked to an inclined position relative to the said other part against the action of said resilient means.

3. A rear viewing mirror comprising a mirror, a base member adapted to be firmly secured to a vehicle body, and means comprising a flexible joint supporting said mirror from said base member, said flexible joint comprising two parts having abutting surfaces and interengaging means for normally locating these surfaces in a predetermined angularly fixed abutting relationship, and resilient coupling means interconnecting the two parts and urging said parts together in said predetermined angularly fixed abutting relationship, said coupling means including a member which is bendable at least in the region of the abutting surfaces, in at least two directions at right angles to each other, said resilient coupling means allowing the two parts both to twist relative to one another about an axis and to rock relative to one another in all directions transversely to said axis when the mirror is pushed or hit and restoring the parts to their precise located relationship, with if necessary manual assistance, when the mirror is released.

4. A rear viewing mirror comprising a mirror, a base member adapted to be firmly secured to a vehicle body, and means comprising a flexible joint supporting said mirror from said base member, said flexible joint comprising two parts having abutting surfaces and interengaging means for normally locating these surfaces in a predetermined angularly fixed abutting relationship, and resilient coupling means interconnecting the two parts and urging said parts together in said predetermined angularly fixed abutting relationship, said resilient coupling means being so constructed and arranged as to allow the two parts to be moved away from one another to release the interengaging means and permit the parts to be twisted relative to one another through at least about 45° and also to allow the two parts to rock relative to one another.

5. A rear viewing mirror comprising a mirror, a base member adapted to be firmly secured to a vehicle body, and a flexible joint supporting said mirror from said base member, said flexible joint comprising two parts, the first of said parts being formed with a non-circular cavity into which a complementary projection on the second of said parts extends, means for releasably restraining turning movement of said projection within said cavity, resilient coupling means interconnecting said parts and urging said projection into said cavity but allowing said parts to be moved apart, said coupling means including a flexible part which permits one of said parts to be rocked to an inclined position relative to the other of said parts against the action of said resilient means.

6. A rear viewing mirror comprising a mirror, a base member adapted to be firmly secured to a vehicle body, and a flexible joint supporting said mirror from said base member, said flexible joint comprising two parts abutting against one another, the first of said parts being formed with a tapering projection of non-circular cross-section which fits within a complementary non-circular cavity on the second of said parts to locate the two parts in a predetermined indexed position, resilient coupling means interconnecting said two parts and urging said projection into said cavity but allowing said parts to be moved in a direction away from each other to move said projection out of said cavity and thereby allow the said parts to twist relative to one another, said resilient coupling means being flexible at least in part so as to permit one part also to be rocked to an inclined position relative to the other part against the action of said resilient means.

7. A rear viewing mirror comprising a mirror, a base member adapted to be firmly secured to a vehicle body, a support member for supporting the mirror from said base member, an adjustable connection between said support member and said mirror, means for tightening or locking said adjustable connection to secure the mirror in a desired adjusted position relative to said support member, and a flexible joint supporting said support member from said base member, said flexible joint comprising two parts having abutting surfaces and interengaging means for locating these surfaces in a predetermined angularly fixed abutting relationship, resilient coupling means interconnecting said two parts in a manner to allow said one part to be moved in a direction away from said other part against the action of said resilient means to release the interengaging means and allow the said one part to twist relative to said other part, said resilient coupling means being flexible at least in part so as to permit the said one part also to be rocked to an inclined position relative to the said other part against the action of said resilient means.

8. A rear viewing mirror comprising a mirror, a base member adapted to be firmly secured to a vehicle body, a support member for supporting the mirror from said base member, an adjustable connection between said support member and said mirror, means for tightening or locking said adjustable connection to secure the mirror in a desired adjusted position relative to said support member, and a flexible joint supporting said support member from said base member, said flexible joint comprising two parts abutting against one another, the first of said parts being formed with a cavity of non-circular cross-section in which a complementary projection on the second of said parts extends, at least one of said projection and cavity having tapering side walls so that when the two parts are in abutting relation the side walls of the projection and cavity engage against each other to locate the two parts in a predetermined indexed position, resilient coupling means interconnecting said two parts and urging said projection into said cavity but allowing said parts to be moved apart to move said projection out of said cavity, by a sideways force applied to one of said parts causing said tapering side walls of one part to move up the side walls of the other part and thereby allow the said parts to twist relative to one another, said coupling means also being flexible at least in part so as to permit one part also to be rocked to an inclined position relative to the other part against the action of said resilient means.

References Cited in the file of this patent

UNITED STATES PATENTS

| | | |
|---|---|---|
| 1,328,930 | Stern | Jan. 27, 1920 |
| 1,681,026 | Bradnack | Aug. 14, 1928 |
| 1,823,636 | Winkler et al. | Sept. 15, 1931 |
| 1,932,697 | Jankovic | Oct. 31, 1933 |
| 1,956,518 | Paulus | Apr. 24, 1934 |
| 2,138,808 | Putterman et al. | Nov. 29, 1938 |
| 2,226,482 | Sarnes | Dec. 24, 1940 |
| 2,534,495 | Younghusband | Dec. 19, 1950 |
| 2,604,818 | Morgenstern | July 29, 1952 |